US 6,195,358 B1

(12) United States Patent
Bowater et al.

(10) Patent No.: US 6,195,358 B1
(45) Date of Patent: Feb. 27, 2001

(54) INTERNET TELEPHONY SIGNAL CONVERSION

(75) Inventors: Ronald John Bowater, Romsey; Simon Robert Davies, Southampton; Lawrence Leon Porter, Lyndhurst, all of (GB); Mark George Stewart Reid Thomas, Boulder, CO (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/914,111

(22) Filed: Aug. 19, 1997

(30) Foreign Application Priority Data

Mar. 15, 1997 (GB) .................................................. 9705438

(51) Int. Cl.[7] .................................................. H04L 12/66
(52) U.S. Cl. .................................................. 370/401; 370/466
(58) Field of Search .................................. 370/212, 213, 370/276, 294, 357, 353, 354, 355, 356, 401, 465, 466, 467, 468

(56) References Cited

U.S. PATENT DOCUMENTS

| 5,526,353 | * | 6/1996 | Henley et al. | 370/392 |
| 5,617,423 | * | 4/1997 | Li et al. | 370/426 |
| 5,724,355 | * | 3/1998 | Bruno et al. | 370/401 |
| 5,761,280 | * | 6/1998 | Noonen et al. | 379/93.27 |
| 5,884,262 | * | 3/1999 | Wise et al. | 704/270 |
| 5,910,946 | * | 6/1999 | Csapo | 370/328 |
| 5,917,835 | * | 6/1999 | Barrett et al. | 348/390 |
| 5,974,043 | * | 10/1999 | Solomon | 370/352 |

FOREIGN PATENT DOCUMENTS

| 0700231 | | 3/1996 | (EP) | H04Q/11/04 |
| WO96/02102 | | 1/1996 | (WO) | H04L/29/06 |
| WO96/15601 | | 5/1996 | (WO) . | |
| WO96/18253 | | 6/1996 | (WO) | H04L/13/00 |
| WO96/20553 | | 7/1996 | (WO) | H04M/3/50 |
| 97/14238 | * | 4/1997 | (WO) | H04L/12/46 |

* cited by examiner

Primary Examiner—Chi H. Pham
Assistant Examiner—Kwang B. Yao
(74) Attorney, Agent, or Firm—Jerry W. Herndon

(57) ABSTRACT

The disclosure concerns a method of processing Internet telephony messages at gateway computer such as an IBM RISC/6000 system, comprising the steps of: receiving an Internet telephony message in a first compression scheme from a computer running an Internet telephone software application which uses the first compression scheme; converting the Internet telephony message into a compression scheme optionally via an intermediate format; sending the Internet message telephony to another computer running another Internet telephone software application using the second format.

22 Claims, 3 Drawing Sheets

INTERNET TELEPHONY SIGNAL CONVERSION

BACKGROUND OF THE INVENTION

The present invention relates to Internet Telephony Signal Conversion.

Although originally intended for the transmission of computer data, more recently the Internet has been exploited to provide real time telephony communications. The primary attraction of the Internet for telephony communications is the low charge compared with conventional telephony. Many Internet users have a dial-up connection to an access provider over a local telephone line, and therefore such users pay only local telephone charges when logged on. Some access providers charge a monthly description, whilst others charge on the basis of connection time (some may do both). However, there is generally no charge associated with actual data transfer over the network. As a result, the effective cost of an international call over the Internet may be no more than that of a local call of the same duration to the access provider. In addition, the fully digital nature of the Internet may potentially offer a richer functionality (eg in terms of conference calling) than conventional telephone networks. Internet phones are surveyed in the article "Dial 1-800-Internet" in Byte Magazine, February 1996, pages 83–88 and in the article "Nattering On", in New Scientist, Mar. 2, 1996, pages 38–40.

The transmission of voice signals over a packet network is described for example in "Using Local Area Networks for Carrying Online Voice" by D. Cohen, pages 13–21, in "Voice Transmission over an Ethernet Backbone" by P. Ravasio, R. Marcogliese, and R. Novarese, pages 39–65, both in "Local Computer Networks" (edited by P. Ravasio, G. Hopkins, and N. Naffah; North Holland, 1982) and also in GB 2283252. The basic principles of such a scheme are that a first computer digitally samples a voice input signal at a regular rate (eg 8 kHz). A number of samples are then assembled into a data packet for transmission over the network to a second terminal, which then feeds the samples to a loudspeaker or equivalent device for playout, again at a constant 8 kHz rate. Voice transmission over the Internet is substantially similar to transmission over a LAN (which may indeed provide part of the Internet transmission path), but there tends to be less spare bandwidth available on the Internet. As a result, Internet phones normally compress the voice signal at the transmitting end, and then decompress it at the receiving end.

One of the major draw backs of the Internet telephony is that few of the Internet phones use the same standards. At present unless you have the same software as the person you are calling then it is impossible to connect with them. There are a variety of sound compression methods used in processing the voice signal and a large number use the Global Standard for mobile Communications (GSM) although some use proprietary compression algorithms. Even when vendors use the same compression algorithms there may be slight variations which can lead to compatibility problems. Another compatibility problem is that products tend to have different connection protocols and there seems little movement towards a common standard.

Another drawback of Internet telephony is that the quality of the voice signal is diminished by compressing and decompressing. In some circumstances a diminished quality signal can be so distorted as to make the message difficult to understand. Difficulty in understanding the message is further compounded if there is background noise, electrical interference, unclear speech or an unfamiliar accent or language.

A further drawback is that long delays can be introduced between messages from the participants which especially in the case of half-duplex transmission increases the difficulty in understanding the message. The factors which contribute to the delays include the time taken to compress and decompress the voice signal and transmission delays on the Internet when the network is busy and when the user has a slow modem connection.

SUMMARY OF THE INVENTION

According to one aspect of the invention there is provided a method of processing an internet telephony message comprising voice data in a first internet telephony format said method comprising the steps of:

receiving said message in a first internet telephony format from a first computer connected to the internet;

performing a first conversion of the message from the first internet telephony format to an intermediate format;

performing a second conversion of the message from the intermediate format to a second format;

sending the message in the second format to a second computer connected to the internet.

According to a second aspect of the present invention there is provided a system of processing an internet telephony message, said message comprising voice data in a first internet telephony format, said system comprising means for receiving said message in a first internet telephony format from a first computer connected to the internet;

means for performing a first conversion of the message from the first internet telephony format to an intermediate format; and means for performing a second conversion of the message from the intermediate format to a second internet telephone format;

means for sending the message to a second computer connected to the internet.

One advantage of the above is that the resources required to support a large number of protocols and compression schemes by using intermediate conversion is less than that when direct conversion is used since only one pair of algorithms is needed per protocol and per compression scheme. Furthermore the intermediate formatted message may be processed for tone detection, voice recognition and the recording of the message. The resources needed to perform such functions on a plurality of formats would be very large compared to those needed for one intermediate format.

In the preferred embodiment the intermediate format is a standard companding format used for voice signals in a voice processing system. Such a voice processing system requires little modification for converting Internet telephony signals and is ideally suited to such an application.

Preferably the intermediate message is an uncompressed digital message. Alternatively the intermediate message is a G.711 digital message.

The converting may be performed by at least one Digital Signal Processor (DSP) chip in a voice processing system. Normally a DSP chip has the capacity to handle multiple voice signals simultaneously. In the embodiment a DSP chip can process 6 voice data streams all in real time allocating fixed time slots to each data stream. One DSP chip converts the first formatted first message into an intermediate format in a first time slot and in an adjacent time slot converts the intermediate formatted first message to the second format. The ability to handle multiple voice channels in real time on a single DSP chip makes a voice processing system an ideal candidate for an Internet telephony conversion application.

A voice processing system comprises a DSP board which includes several DSP chips—the embodiment has a total of six DSP chips on one board. Another method of performing the voice conversion using the intermediate format is to perform the conversion on two DSP chips. A first chip converts the message from one format to the intermediate format, the message is then passed to a second DSP chip and the conversion performed from the intermediate format to the second format. A voice processing system further comprises several DSP boards. A further method of performing the voice conversion using the intermediate format is to perform the first part of the conversion on a DSP chip on one board, pass the intermediately formatted signal to another chip on another board for the second part of the conversion.

In the cases where the two part processing is not performed on a single chip the intermediate message is passed from one DSP chip to another DSP chip via a data bus. In such a case it is a particular advantage that the DSP chips communicate with each other over a dedicated bus such as a Time Division Multiplexed bus (TDM) which can guarantee data delivery at a fixed rates. This is another feature of a voice processing system which makes it particulary beneficial for use in internet telephony conversion. The TDM is linked to a number of DSP chips within the voice processing system and any one of the linked DSP chips can process the intermediate message. A further benefit of using a voice processing system is that other functions in addition or as an alternative to the Internet telephony format conversion may be performed without hardware modification under instruction from the voice processing system. DSPs may be programmed to perform standard tasks on the Internet telephony signal once it has been converted to the voice processing intermediate format. The resources needed to perform such functions without an intermediate format would be very large compared to those needed for one with. An alternatively DSP chips can communicate with each other over voice channels routed through a private branch switch (PBX).

For two way communication, a second message in the second format is received from the second computer network, the second format is converted into the first format and sent to the first computer network. Preferably the respective formats of the first and second messages are converted simultaneously for full duplex communication.

In an alternative embodiment for conference communication said first and second messages are converted to a third format and sent to a third computer network telephone and a third message from the third computer network telephone is converted from a third format into said first and second format and sent to said first and second computer network telephone respectively.

The computer network messages maybe solely voice messages or maybe video and voice messages.

The conversion may be performed locally with respect to one of the computer network telephones but more realistically the conversion is performed at an intermediate note remote from the computer network telephone. Typically a network provider or Internet telephone company would have an intermediate node for performing the conversion.

In a further embodiment the step of converting may be a voice recognition step which converts the speech of the message into text and whereby the second format is a text format. The voice recognition step is preferably the step of converting the intermediate format into the second format thereby converting the speech of the message into text. In one aspect of this embodiment there is no second voice format and the second format is a text only format. In another aspect of this embodiment there is conversion to both voice and text and the method further comprises a voice recognition step which converts the intermediate format into a third format and whereby the third format is a text format and the second format is a voice format. In the case where understanding the message was of importance both a voice message and text message would be sent to the second computer network. The recipient would see a textual representation of the speech and understanding would be greatly enhanced. In some circumstances having dual text and speech aids the comprehension of the message. For instance when the conversation is not in the native tongue of one of the speakers or when band width problems reduce the clarity of the speech.

In the case where transmission times are affecting the performance of the Internet telephone then text could be sent instead of speech therefore making a dramatic saving in bandwidth. This method of communication would look like Internet Relay Chat (IRC) but the participants would be speaking rather than typing.

According to a third aspect of the invention there is provided a system of processing an internet telephony message, said message comprising voice data in a first internet telephony format, said system comprising means for receiving said message in a first internet telephony format from a first computer connected to the internet;

means for performing a first conversion of the message from the first internet telephony format to an intermediate format; and means for performing a second conversion of the message from the intermediate format to a second internet telephone format;

means for sending the message to a second computer connected to the internet.

BRIEF DESCRIPTION OF THE DRAWINGS

This and other aspects of the present embodiment will now be described, by way of example only, with reference to the following drawings in which.

DETAILED DESCRIPTION

Figure 1:
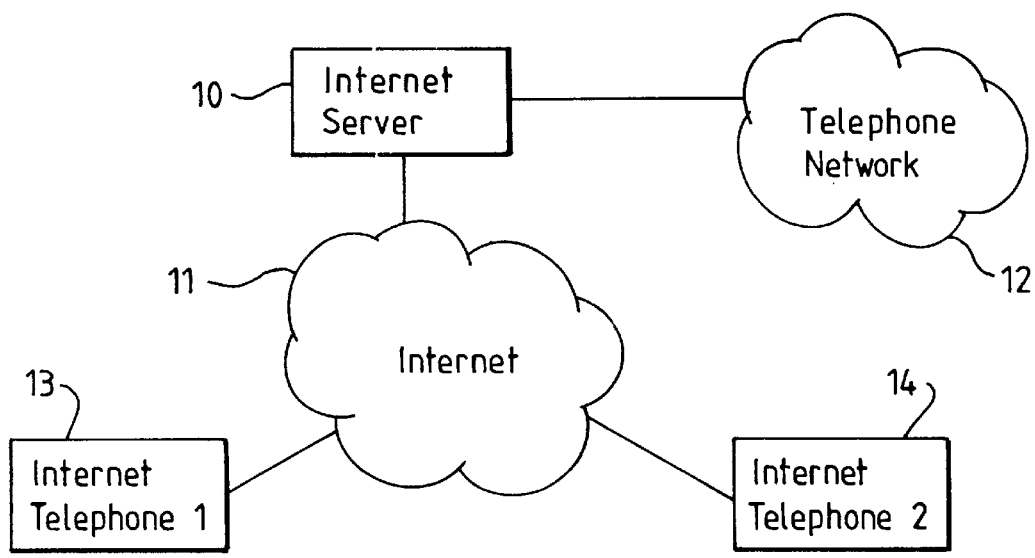
FIG. 1 is a schematic representation of two computer network telephones connected by a computer network.

The first and second embodiments of the present invention comprise a signal processing system comprising a network server (10) connected to a computer network (11) and first and second network telephones (13, 14) connected to the server (10) via the computer network (11) (see FIG. 1). The preferred network is the Internet but the network can be single WAN, a corporate intranet or any combination of networks. The computer server (11) is connected to a LAN via a LAN adapter and the LAN is connected to the Internet via an Internet gateway, for example in another server on the LAN. In the embodiments the first and second network telephones (13, 14) are remote from the LAN and connected independently to the Internet. However, one, some, or all of the network telephones maybe part of the LAN network.

Figure 2:
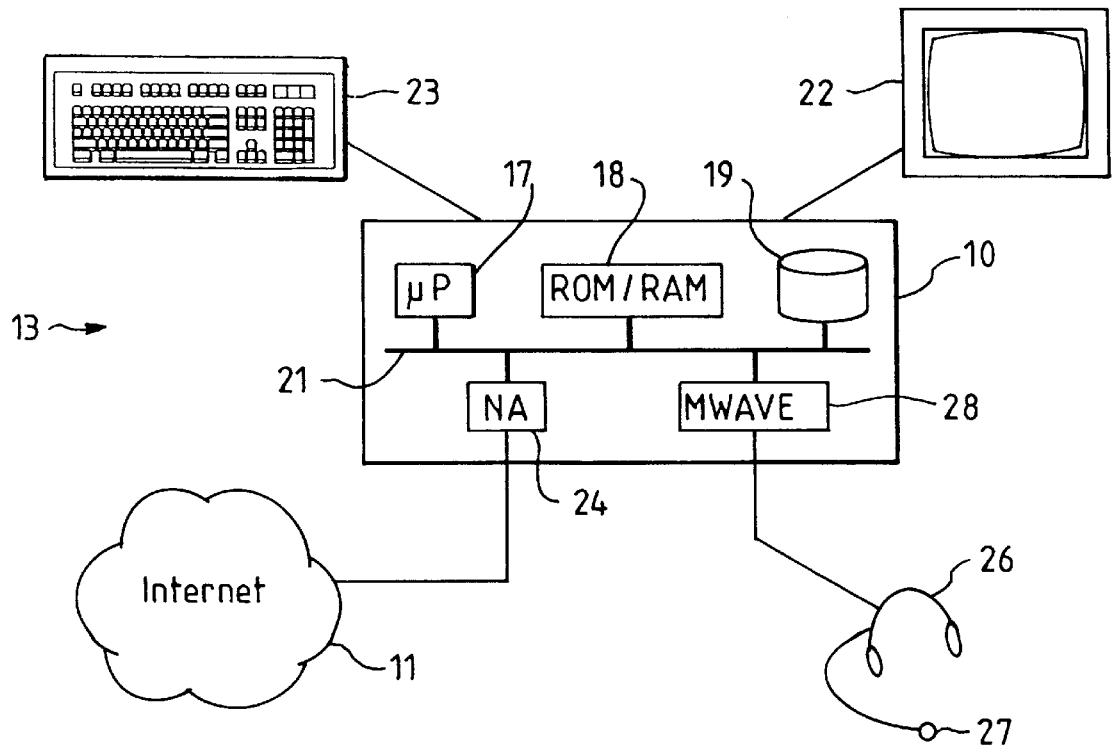
FIG. 2 is a schematic representation of a computer network telephone system.

A personal computer set up as a network telephone (13, 14) typically has a computer (10) including microprocessor (17), semi-conductor memory (ROM/RAM) (18), hard disk (19), and a bus (21) over which data is transferred. Other components of the computer (16) are a display (22) keyboard (23) and mouse (not shown) (see FIG. 2). The computer maybe any conventional workstation, such as an Aptiva computer, available from IBM Corporation. Alternatively, any other form of suitable network access device, including the new generation of low-cost systems ('network computers' or 'thin clients'—effectively sub-PCs) which are currently being developed, maybe employed as the client telephone terminal.

The computer (10) is equipped with a network adapter card (24). This card, together with accompanying software such as the TCP/IP communications stack, allows messages to be transmitted onto and received from a computer network such as the Internet via a Local Area Network (LAN). Alternatively the Internet is accessed using a modem and via an Internet provider. A modem (not shown), is installed either internally as another adapter card, or externally, for example via the RS-232 serial port. The modem is connected to a telephone socket and allows dial-up access to an Internet provider. The operation of a network adapter card or modem to provide Internet access is well-known, and so will not be described in detail.

An audio card (28), for example MWave from IBM Corporation, is connected to the bus (21) and to a headset including microphone (27) and earphones (28) for audio input and output respectively. Alternatively the computer may have a loudspeaker, and built-in microphone, but the use of a headset is preferred to optimise the quality of the audio signal produced and actually heard.

Figure 3:
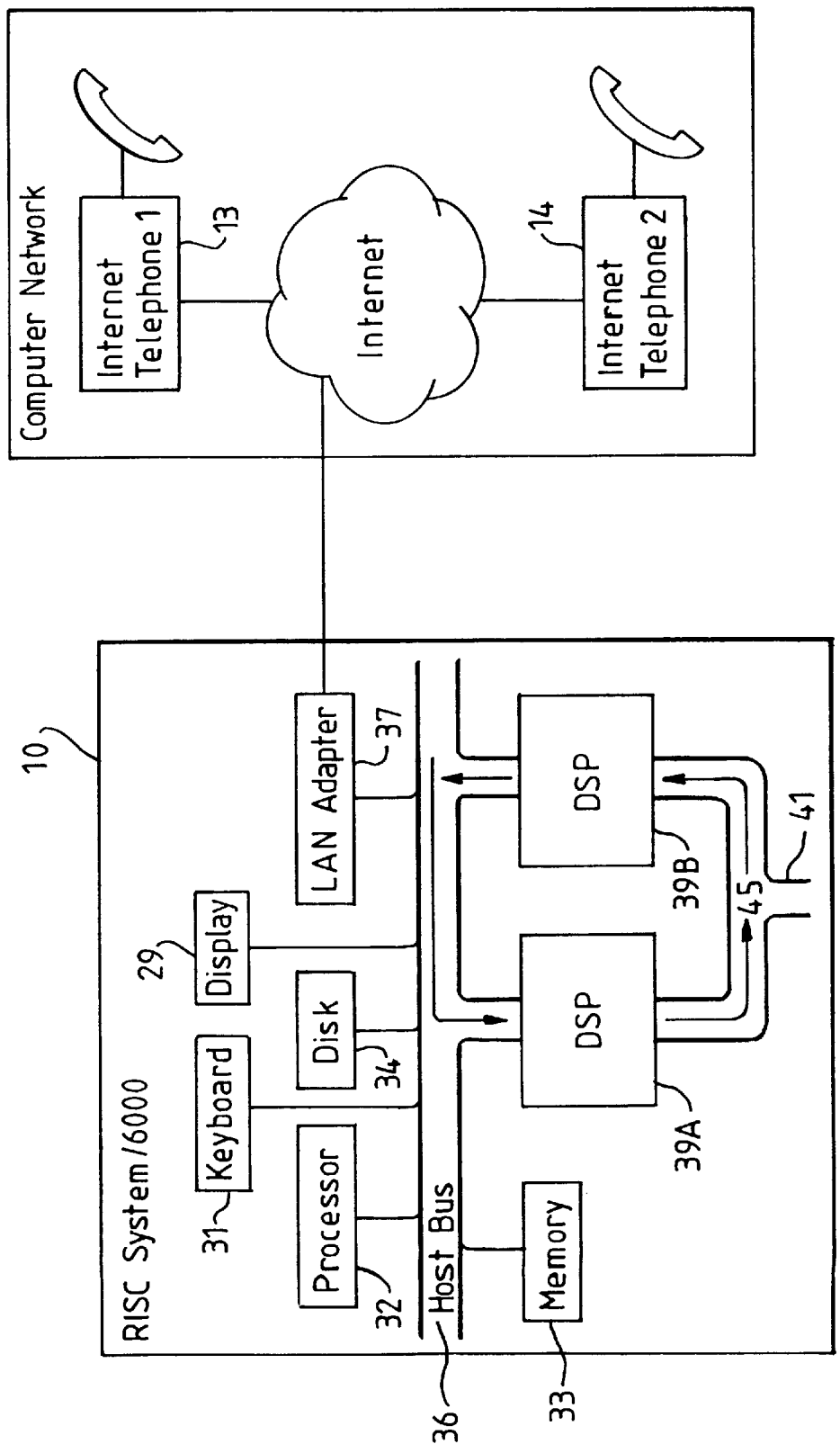
FIG. 3 is a schematic representation of the network server, and computer network of the first embodiment.

The network server (10) is based on a conventional computer work station comprising display screen (29), keyboard (31), microprocessor (32), ROM/RAM (33), disk storage (34) and host bus (36) to connect the components (see FIG. 3). The RISC system/6000 workstation, available from the IBM Corporation, is most suitable. The host bus is a processor independent bus such as a Peripheral Component Interconnect bus (PCI bus). The network server (10) is typically connected to the Internet via a LAN adapter (37) and an Internet gateway.

In the embodiments there is connected to the host bus (36) a plurality of Digital Signal Processor cards having a number of Digital Signal Processor chips (39A, 39B) (DSPs). Each DSP is programmed (39A) to convert a digital signal having one protocol and compression scheme into another digital signal having different protocol and scheme. In this embodiment the invention is described using two DSP chips performing a two stage conversion however a single DSP (39A) may perform the whole conversion either as a single stage conversion or a two stage conversion with a intermediate part. The two DSP's may be on the smae board or on different boards.

In the first embodiment a Time Divisioned Multiplex bus (41) (TDM) links the DSPs allowing DSP (39A) to communicate with DSP (39B) by transmitting data in the form of time frames. This allows the capacity of the TDM bus (41) to be shared evenly among the DSPs.

In the second embodiment, the network server (10) uses a Digital Trunk Adapter (38) connected to the host bus (36)

for connecting the DSP's together. The DTA (38) is connected to a digital trunk processor (DTP) (43) via voice channels (44A, 44B) and the DTP (43) is connected to a private branch exchange (PBX) (42) via voice channels (46A, 46B). The PBX (42) connects an external telephony network to the voice channels (44, 46) of the DTP (43). The PBX can also connect voice channels (46A, 46B) together. The DTP (43) demultiplexes incoming signals and multiplexes outgoing signals on the trunk line, and performs log-linear conversion as appropriate. The DTP (43) can also perform compression/decompression of the digital signals. The voice channels (46A, 46B) are channels of a T1/E1 telephony bus linking the PBX with the DTP.

Figure 4:
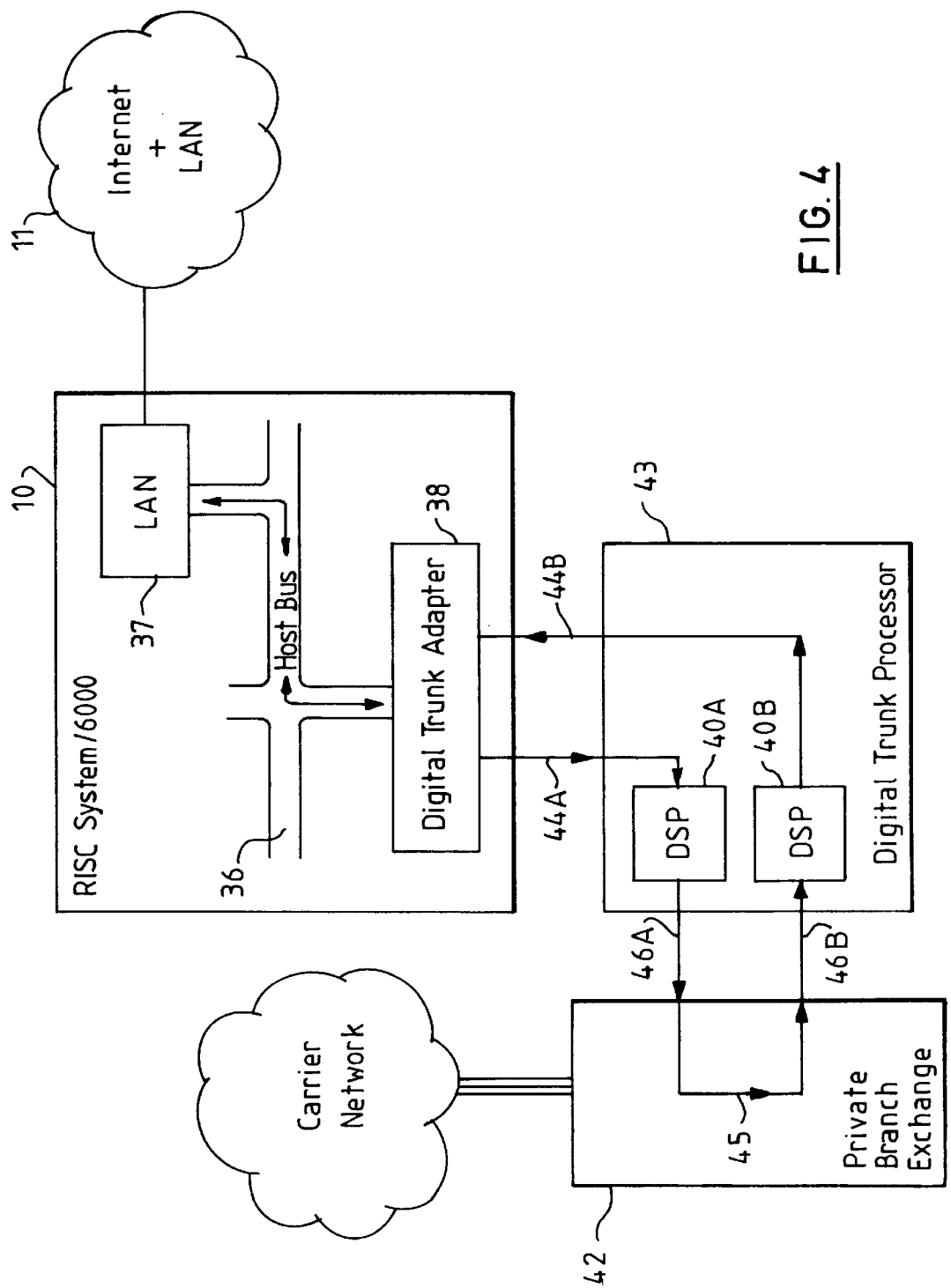
FIG. 4 is schematic representation of the network server and computer network of the second embodiment.

In the second embodiment, the DSPs (40A, 40B) are located in the Digital Trunk Processor (43) (see FIG. 4).

In both embodiments the RISC System/6000 workstation has an operating system such as AIX and the DSP control software. In most cases this will be running on top of DirectTalk/voice processing software. Conversion application control software routes the Internet telephony signal through one or more DSPs that can convert it to the Internet telephony signal that is required. RISC System/6000, Direct-Talk and AIX are all trademarks of IBM Corporation.

Internet telephones use a variety of compression schemes and transport protocols. Three of the more common compression schemes are described briefly. Global System for Mobile Communications (GSM) is also used in Europe for mobile phones and uses residual pulse excitation (RPE) and long term prediction (LTP) to provide 5:1 compression of raw audio with an acceptable loss of quality when decompressed. TrueSpeech was developed by the DSP group and can compress raw audio up to 18:1 with an imperceptible loss of quality when decompressed. The downside to TrueSpeech is that it requires considerable computing power and so requires a faster processor then would GSM to compress the same audio signal in real time. One Internet phone uses the former on a 486-based computer and the latter when running on a Pentium based computer. Another Internet phone company uses a proprietary compression scheme in its product to compress raw audio data down to 7.7 Kbps.

The DirectTalk/voice processing software uses a standard companding scheme such as Pulse Code Modulation (PCM). Companding quantization works by scaling voice signals to combat quantization distortion common with linear quantization. $\mu$ law and A law are the standard voice PCM companding schemes used in North America/Japan and Europe respectively.

The operation of the embodiments is as follows. An Internet phone call is initiated at a first Internet phone (13) by sending a message in a first format to a second Internet phone (14) via the network server (10). The network server (10) may send a message to the second Internet phone which is the recipient of the call to notify him of the call. The network server determines which format the second Internet phone uses either from a database of such information or by making requests to the second Internet phone. The Internet telephone message is incoming over the LAN adapter (37) from the first Internet phone and comprises a header part having the protocol scheme and message data and a voice part comprising companded data. The processor (32), under instruction from conversion application control software, reads the header part and determines the protocol and compression scheme used. The message is stripped of the header and the compressed data part of the message is passed on to a DSP via the host bus. The DSPs are configured to decompress and recompress the data corresponding to information in the header. The first DSP (13, 40A) converts the incoming Internet telephony message from the first format to an intermediate format (45). The intermediate format is Pulse Code Modulation (PCM) or a modified GSM. Such a format is the standard format for the majority of operations on the RISC/6000 system.

In the first embodiment the intermediate formatted message is routed over the TDM bus (41) to a second DSP (39B) within the network server (10) (see FIG. 3).

In the second embodiment the DSPs (40A, 40B) are located in the DTP (43) and the intermediate formatted message is routed along the host bus to the DTA (38) and then along voice channel (44A) to the DTP (see FIG. 4). The first DSP (40A) within the DTP (43) converts the message from the first format to the intermediate format (45). From the DTP (43) the message is routed along a further voice channel (46A) to the PBX (42). Instead of routing the message to the external telephone network the message is internally switched back along another voice channel (46B) back to a second DSP (40B) within the DTP (43). At this junction the message is converted from the intermediate format to the second format and routed back to the DTA (38) along voice channel (43 and then host bus.

In both embodiments the second DSP (39B, 40B) converts the message to the format of the receiving Internet telephone. The processor (32) under instruction from the conversion application control software, adds new header information according to the protocol of the second Internet phone and sends the reformatted message to the second Internet phone.

As a single DSP chip has the capacity to process 6 voice messages at a time and it is possible for a single DSP to handle a full duplex two way conversation using two thirds of the DSP's capacity.

In another embodiment the network server performs voice recognition on an Internet phone message converting message from voice to text. This is in addition to or as an alternative to converting a voice message from one format to another. The message from the first Internet phone is converted from the PCM or modified GSM intermediate format into text by one of the DSPs. Again, because the voice processing system is designed for such signals, a minimum amount of hardware configuration is required and the feature may be controlled through control software. The text message is then sent to the second Internet phone at the same time as the specially formatted voice message.

In summary, the disclosure concerns a method of processing Internet telephony messages at gateway computer such as an IBM RISC/6000 system, comprising the steps of: receiving an Internet telephony message in a first compression scheme from a computer running an Internet telephone software application which uses the first compression scheme; converting the Internet telephony message into a compression scheme optionally via an intermediate format; sending the Internet message telephony to another computer running another Internet telephone software application using the second format.

Suitable voice recognition software is now commercially available to run on DSP cards, the accuracy is not perfect but the errors do need seriously impede the understanding of the message. Furthermore such software is continually being improved and maybe updated on the voice processing system when desired.

An internet telephony conversion server as described provides a valuable service which may generate revenue for the service provider. Charges could be made on a time usage basis or on a per call basis. Functions for calculating such charges are already available on voice processing systems.

What is claimed is:

1. A method of processing, at a voice processing gateway system, an internet telephony message comprising voice data said method comprising the steps of:

receiving said message in accordance with the Internet Protocol at said gateway system in a first internet telephony format from a first computer connected to the internet;

performing on a digital signal processor channel at said gateway system a first conversion of the message from the first internet telephony format to an intermediate format in conformity with the internal processing of said gateway system;

performing on an adjacent digital signal processor channel at said gateway system a second conversion of the message from the intermediate format to a second format said second format being a different format to said first format whereby said second conversion is not a conversion back to said first format but a conversion to a format different to said first format;

sending from said gateway system in accordance with the Internet Protocol the message in the second format to a second computer connected to the internet.

2. A method according to claim 1 wherein the intermediate format is a non internet voice data format.

3. A method according to claim 1 wherein the intermediate format is Pulse Code Modulation.

4. A method according to claim 1 wherein the converting is performed by a single Digital Signal Processor (DSP) having at least two processing channels.

5. A method according to claim 1 wherein the converting is performed by a first and second digital processor within the same gateway system.

6. A method according to claim 5 wherein the first DSP converts the first formatted first message into the intermediate format and the second DSP converts the intermediate formatted message into the second format.

7. A method according to claim 1 wherein the converting is performed at a node intermediate the first and second computer network telephones.

8. A method according to claim 7 wherein the message is a first message and a second message in the second format is received from the second computer network, the second format is converted into the first format and the second message is sent to the first computer network for two way communication.

9. A method according to claim 8 wherein the respective formats of the first and second messages are converted simultaneously for full duplex communication.

10. A method according to claim 9 wherein the respective formats of the first and second messages are converted to a third format and messages having the third format are sent to a third computer network telephone and a third message is converted from a third format into said first and second format and sent to said first and second computer network telephone respectively for conference communication.

11. A method according to claim 1 wherein the DSPs communicate with each other over a dedicated bus connecting them.

12. A method according to claim 11 wherein the dedicated bus is a Time Division Multiplexed bus (TDM).

13. A method according to claim 1 wherein the DSPs communicate with each other through voice channels routed through a private branch switch (PBX).

14. A method according to claim 1 wherein the intermediate message is an uncompressed digital message.

15. A method according to claim 1 wherein the message is a voice message and the step of converting is a voice recognition step that converts the voice message into text and whereby the second format is a text format.

16. A method according to claim 1 wherein the message is a voice message and the step of converting the message from the intermediate format into the second format is a voice recognition step that converts the voice message into text.

17. A method according to claim 1 wherein said message is a voice message and said method comprises a further conversion step that converts the message from its intermediate format into text.

18. A method as claimed in claim 17 wherein said message is sent to the second computer network telephone in the second format and as text.

19. A method according to claim 1 wherein the method further comprises:

identifying the internet telephony format of the first computer; and selecting an appropriate algorithm from a plurality of conversion algorithms to perform said first conversion.

20. A method according to claim 1 wherein the method further comprises identifying the internet telephony format of the second computer; and selecting an appropriate algorithm from a plurality of conversion algorithms to perform said second conversion.

21. A voice processing gateway system for processing an internet telephony message, said message comprising voice data said system comprising:

means for receiving said message in accordance with the Internet Protocol in a first internet telephony format from a first computer connected to the internet;

means for performing on a digital signal processor channel a first conversion of the message from the first internet telephony format to an intermediate format in conformity with the internal processing of said gateway system;

means for performing on an adjacent digital signal processor channel a second conversion of the message from the intermediate format to a second internet telephone format said second format being a different format to said first format whereby said second conversion is not a conversion back to said first format but a conversion to a format different to said first format; and means for sending in accordance with the Internet Protocol the message in the second format to a second computer connected to the internet.

22. A system according to claim 21 further comprising:

a plurality of conversion algorithms for converting an internet telephony message from one of a plurality of formats to said intermediate format;

means for identifying the internet telephony format of the first computer and selecting the appropriate algorithm to perform the first conversion; and means for identifying the internet telephony format of the second computer and selecting the appropriate format to perform the second conversion.

* * * * *